US005669006A

United States Patent [19]
Joskowicz et al.

[11] Patent Number: 5,669,006
[45] Date of Patent: Sep. 16, 1997

[54] METHOD FOR AUTOMATICALLY OBTAINING SPATIAL LAYOUT FOR MULTIMEDIA PRESENTATIONS

[75] Inventors: Leo Joskowicz, Bronx; Michelle Yoonkyung Kim; Junehwa Song, both of Scarsdale, all of N.Y.

[73] Assignee: International Business Machines Corporation, Armonk, N.Y.

[21] Appl. No.: 392,717

[22] Filed: Feb. 23, 1995

[51] Int. Cl.$^6$ .................................................. G06F 15/00
[52] U.S. Cl. .......................... 395/779; 395/807; 395/937
[58] Field of Search .................................. 395/144–148, 395/154, 155, 157, 158, 160, 161, 762, 764, 765, 806, 807, 779, 788, 937

[56] References Cited

U.S. PATENT DOCUMENTS

| | | | |
|---|---|---|---|
| 4,723,210 | 2/1988 | Barker et al. | 395/147 |
| 5,179,650 | 1/1993 | Fukui et al. | 395/148 |
| 5,214,755 | 5/1993 | Mason | 395/147 |
| 5,278,946 | 1/1994 | Shimada et al. | 395/62 |

(List continued on next page.)

OTHER PUBLICATIONS

Graf, "LAYLAB—A constraint-based layout manager for multimedia presentations", Proc. of 5th Int'l Conf. on Human–Computer Interaction, pp. 446–451. Aug. 1993.

Weitzman et al., "Automatic presentation of multimedia documents using relational grammars", Proc. of ACM Multimedia '94, pp. 443–451. Oct. 1994.

lino et al., "An object–oriented model for spatio–temporal synchronization of multimedia information", Proc. of Int'l Conf. on Multimedia Computing and Systems, pp. 110–119. May 1994.

(List continued on next page.)

*Primary Examiner*—Heather R. Herndon
*Assistant Examiner*—Joseph R. Burwell
*Attorney, Agent, or Firm*—Whitham, Curtis, Whitham & McGinn; Louis J. Percello

[57] ABSTRACT

A computer implemented method reduces the complexities of obtaining a spatial design in a multimedia presentation. The method is an interactive process which assists an author in readily arriving at a suitable spatial design in the multimedia presentation. A set of objects that appear on the computer display screen simultaneously is termed a clique. The spatial design for a multimedia clique is defined in terms of three dimensions, two dimensions defining the plane of the computer display screen and the third dimension defining the depth of overlapping objects. The locations of the associated episodes and their respective depths on the screen are found. This process involves resolving space requirements between the several episodes in the clique according to a defined set of constraints. Assuming that a resolution can be reached which provides a consistent layout, the layout is displayed. The user is then given the opportunity to change the predefined set of constraints, resulting in the display of the layout with the changed set of constraints. If the layout is still not satisfactory, the user can change the sizes and locations of individual episodes in the clique. Based on the changed constraints for the episodes in the clique, the process again automatically determines a layout which is displayed for review and possible acceptance by the user. When the spatial design is finally accepted by the user, the process outputs the spatial design for the clique. Given a series of cliques which constitute an entire multimedia story, a technique of constraint propagation is provided. More particularly, an object in one clique may be displayed with other objects in a succeeding clique. Rather than moving that object around, the option is provided to fix the position of the object and let the other objects move around the fixed one.

8 Claims, 9 Drawing Sheets

U.S. PATENT DOCUMENTS

| | | | |
|---|---|---|---|
| 5,311,443 | 5/1994 | Crain et al. | 364/491 |
| 5,495,567 | 2/1996 | Iizawa et al. | 395/161 |
| 5,499,366 | 3/1996 | Rosenberg et al. | 395/600 |
| 5,515,490 | 5/1996 | Buchanan et al. | 395/807 |
| 5,517,621 | 5/1996 | Fukui et al. | 395/148 |
| 5,544,301 | 8/1996 | Orton et al. | 395/157 |

OTHER PUBLICATIONS

Hamakawa et al., "Object composition and playback models for handing multimedia data", Proc. of 1 st ACM Int'l Conf. on Multimedia. Jan. 1993.

Kamada et al., "A general framework for visualizing abstract objects and relations", ACM Transactions on Graphics, vol. 10, No. 1, pp. 1–39. Jan. 1991.

Borning et al., "Constraint–based tools for building user interfaces", ACM transactions on Graphics, vol. 5, No. 4, 345–374. Oct. 1986.

Myers et al., "Environment for rapidly creating interactive design tools", Visual Computer, vol. 8, No. 2, pp. 94–116. Jan. 1992.

Tsuhara, "Automatic layout of dialogue components using fuzzy rules", Transactions of the IEE, vol. 113, No. 7, pp. 479–487 Jan. 1993.

Feiner, "A grid–based approach to automating display layout", Graphics Interface '88, pp. 192–197. Jun. 1988.

Haarslev et al., "Visualization and graphical layout in object–oriented systems", J. of Visual Languages and Computing, pp. 1–23. Mar. 1992.

Luders et al., "Improvement of the user interface of multimedia applications by automatic display layout", Proc. of Multimedia Computing and Networking 1995, SPIE vol. 2417, pp. 54–64. Feb. 1995.

METHOD FOR AUTOMATICALLY OBTAINING SPATIAL LAYOUT FOR MULTIMEDIA PRESENTATIONS

BACKGROUND OF THE INVENTION

1. Field of the Invention

The present invention generally relates m composing and playing multimedia documents and, more particularly, to automatically generating a spatial layout of the visible segments on a computer display screen.

2. Background Description

Electronic multimedia documents have become popular for storing multimedia documents such as encyclopedias and the like since this media is capable of storing a large amount of data, including text, graphics, action video, sound, and the like, which when combined form a multimedia document. The user of a multimedia document typically presents or receives multimedia information called fragments, segments, or multimedia objects, hereinafter called episodes, through the computer input or output, respectively. Generally, these multimedia episodes include information having a sensory quality that can take the form of audio and visual information like audio and video clips, musical recordings, speech, typed text, still picturers, drawings, animation, choreographed dance steps, and the like.

Multimedia authoring can be viewed as a process of ordering multimedia objects, such as texts, graphics, sounds and videos in time and space. A set of multimedia objects, or episodes, to which a certain ordering has been given is called a story. Ordering of the objects with respect to a story is done in the temporal dimension and in the spatial dimension. The invention described herein is related to the problem of obtaining a spatial layout.

A multimedia story may be associated with a set of screen layouts depending on how the objects are related to each other in time. We call a set of objects in a multimedia story that appear on the display screen simultaneously a CLIQUE. Obtaining a spatial design (or screen layout) for a clique may be a straightforward task for a small number of objects (episodes). But with a large number of objects having perhaps complicated spatial relations between them, it becomes an involved and tedious process to find a suitable spatial design, especially if the process is to be iterated, as is the case with many design processes.

SUMMARY OF THE INVENTION

It is therefore an object of the present invention to provide a method that reduces the complexities of obtaining a spatial design in a multimedia presentation.

It is another object of the invention to provide an interactive process which assists an author in readily arriving at a suitable spatial design in a multimedia presentation.

It is a further object of the invention to provide a process of spatial design of an entire multimedia story by a method of constraint propagation.

According to the invention, there is provided a process in which the spatial design for a multimedia clique is defined in terms of three dimensions, two dimensions defining the plane of the computer display screen and the third dimension defining the depth of overlapping objects. The locations of the associated episodes and their respective depths on the screen are found. This process involves resolving space requirements between the several episodes in the clique according to a defined set of constraints. Assuming that a resolution can be reached which provides a consistent layout, the layout is displayed. The user is then given the opportunity to change the predefined set of constraints, resulting in the display of the layout with the changed set of constraints. If the layout is still not satisfactory, the user can change the sizes and locations of individual episodes in the clique. Based on the changed constraints for the episodes in the clique, the process again automatically determines a layout which is displayed for review and acceptance by the user. When the spatial design is finally accepted by the user, the process outputs the spatial design for the clique. Given a series of cliques which constitute an entire multimedia story, we employ a technique of constraint propagation. More particularly, an object in one clique may be displayed with other objects in a succeeding clique. Rather than moving that object around, we may provide the option to fix the position of the object and let the other objects move around the fixed one.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
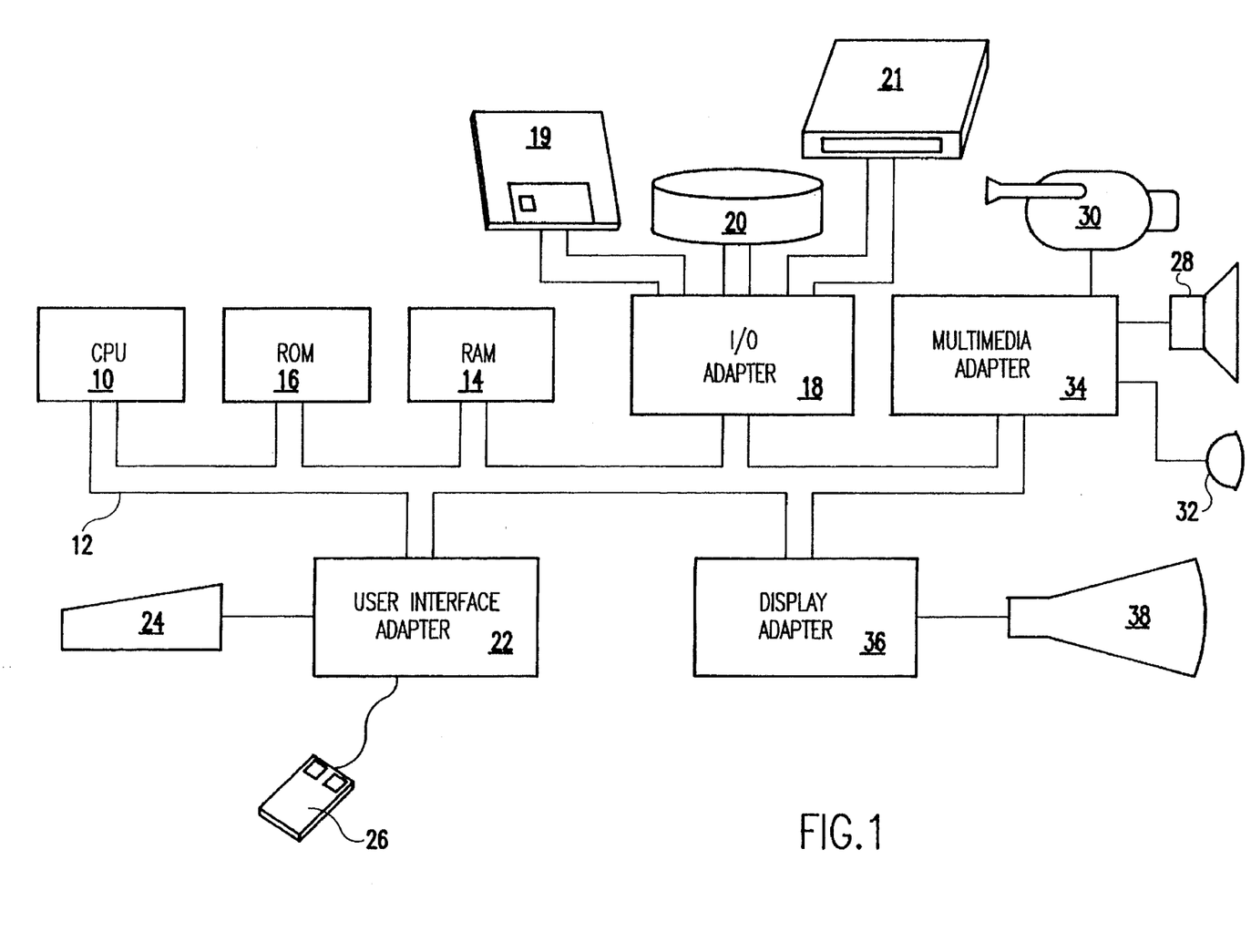
FIG. 1 is a block diagram showing a hardware configuration on which the subject invention may be implemented.

Referring now to the drawings, and more particularly to FIG. 1, there is shown a representative hardware environment which may be a personal computer, such as the International Business Machines (IBM) Corporation's Personal System/2 (PS/2) family of Personal Computers. The hardware includes a central processing unit (CPU) 10, which may conform to Intel's X86 architecture or may be a reduced instruction set computer (RISC) microprocessor such as IBM's PowerPC microprocessor. The CPU 10 is attached to a system bus 12 to which are attached a read/write or random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a floppy drive 19, a hard disk drive 20 and a CD-ROM 21. The hard disk drive 20 typically stores the computer's operating system (OS), such as IBM's OS/2 operating system, and various application programs, each of which are selectively loaded into RAM 14 via the system bus 12. The user interface adapter 22 has attached to it a keyboard 24, a mouse 26, and/or other user interface devices (not shown).

The personal computer or workstation also includes a display 38, here represented as a cathode ray tube (CRT) display but which may be a liquid crystal display (LCD) or other suitable display. The display 38 is connected to the system bus 12 via a display adapter 36. A multimedia adapter 34, such as Intel Corporation's ActionMedia II Display Adapter, is connected to the bus 12 and to a microphone 32, a speaker 28 and a video camera 30 for audio/video capture and playback. The multimedia adapter 34 is supported by suitable software, such as IBM's Multimedia Presentation Manager/2. As will be understood by those skilled in the art, other multimedia hardware and software may be incorporated into the system, including but not limited to video cassette recorders (VCRs), laser disk players, surround sound processors, and the like.

In the practice of the invention, multimedia objects in a story are automatically arranged in a spatial layout. Not all objects are visible. For instance, an audio episode or a time delay has zero screen real estate, thus occupying only the time dimension. Those invisible objects are ignored, and only visible objects are considered in the spatial design of the multimedia presentation. For visual episodes, the location and the amount of space they may occupy on the screen may vary depending on the number and the relationships between them. Considering the general case where there can be overlaps between objects on the display screen, finding a spatial design for a multimedia clique can be characterized as a three dimensional problem in XYZ space, where XY are two dimensions that define a plane and Z is a dimension defining the depths of overlapping objects.

Figure 2:
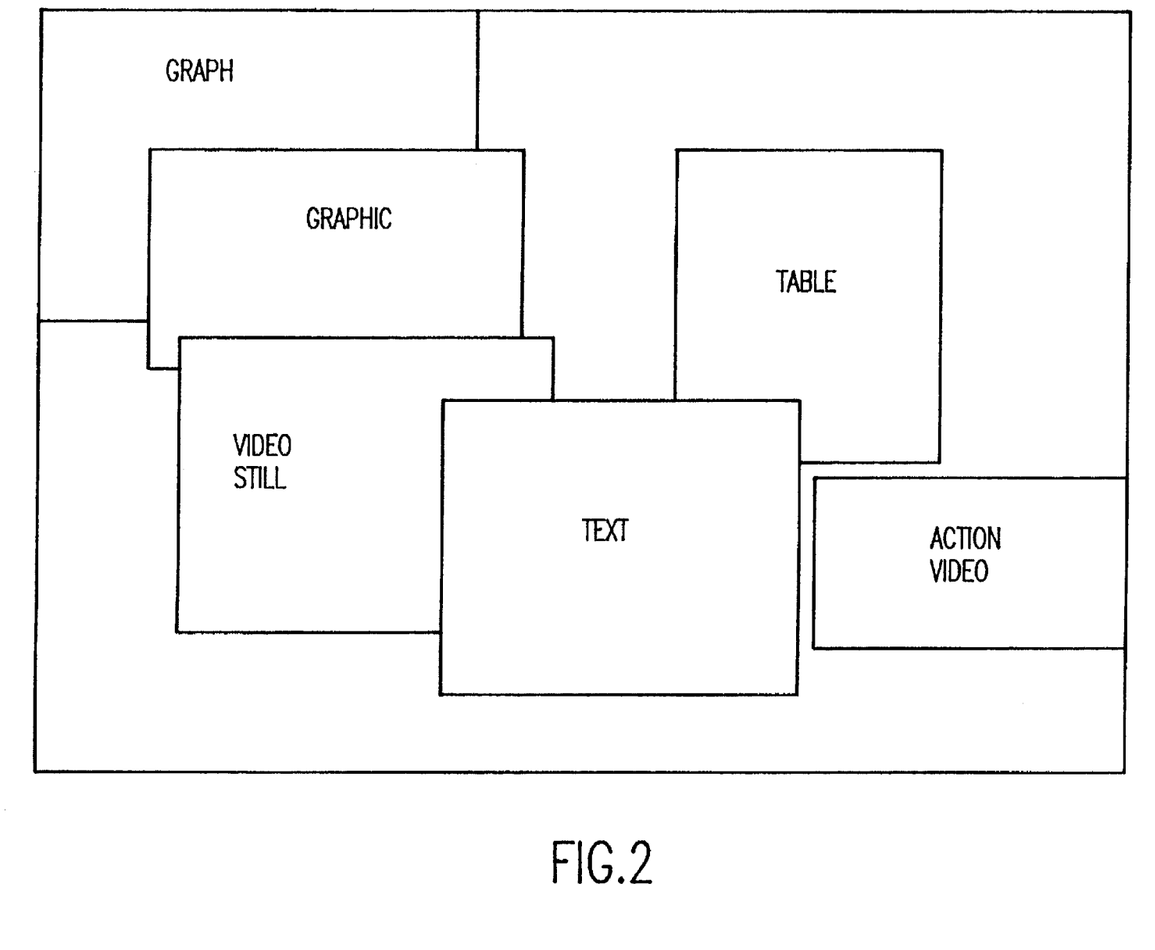
FIG. 2 is an illustration of a computer screen showing a generalized spatial layout of a clique of visible episodes.

To obtain a screen layout for a given clique is to find the locations of its associated episodes and their depths (i.e., Z-ordering) on the screen. Let E denote the set of episodes in a multimedia clique C. Without loss of generality, we assume that each of the visible episodes of E may occupy a rectangular region on the screen, and each is associated with an optimal area and aspect ratio requirements. The area of an episode is defined by the product of its width, w, in the x direction and its height, h, in the y direction, and the episode's aspect ratio is the ratio of its width to its height, or w/h. We also assume that for each episode, a set of topological constraints, such as a minimum area requirement and a prespecified range of aspect ratios, are given. Furthermore, relative placement constraints may also be given on the episodes; e.g., an episode is to the right of another. An example is illustrated by the screen shown in FIG. 2 where a plurality of episodes comprising a clique are shown, some overlapping.

Given the dimensions of the display screen, the task is to find the positions and dimensions of the rectangles for all the episodes in a clique such that they all fit on the screen and satisfy the constraints. The spatial layout process consists of the following steps: (1) obtain initial placements for the episodes in the clique, and (2) negotiate space requirements between them. In a simple treatment, each episode type may assume a default position and default (optimal) dimensions from which an initial screen layout may be generated. The initial layout can then be refined by the author by resizing or moving the corresponding rectangles.

With an overlap on the screen, the depths of the overlapping episodes become important presentation issues. To reflect the depth measure, we set up a three dimensional coordinate system by adding the Z-axis perpendicular to the XY plane. Z-ordering defines the relative depths for overlapping episodes as they appear on the display screen. We say that an episode $E_1$ is behind episode $E_2$ if the two episodes are in the same clique, they overlap and a portion of episode $E_1$ is hidden by episode $E_2$. A partial ordering may be defined on the set E according to the following $<$ relation:

$E_1 < E_2$ if $E_1$ is behind $E_2$.

Given a clique, defining a Z-ordering is to define the $<$ relation on its episodes E. Given a clique C, let Z-List(C) denote a list which is partially ordered according to the $<$ relation, such that $E_i < E_{i+1}$, where $E_i$ denotes the ith episode in the Z-List. Initially, the Z-List is created with a certain assumption specified by the author or by the system. The elements on the Z-List may then be shuffled around according to the following Z-order constraints. Each constraint is associated with a priority (1 being the highest priority):

1. No episode shall be hidden completely behind another.
2. A button should always be fully visible. A button is a defined area within the episode that a user can select and thereby invoke a process linked to that area.
3. A portion of a text may not be hidden behind another episode.
4. An episode that takes up a larger area may be behind a smaller one.

Conflicts among the Z-order constraints may be resolved according to their priorities; e.g., if a button and a text episode overlap, the button should still be fully visible.

Figure 3:
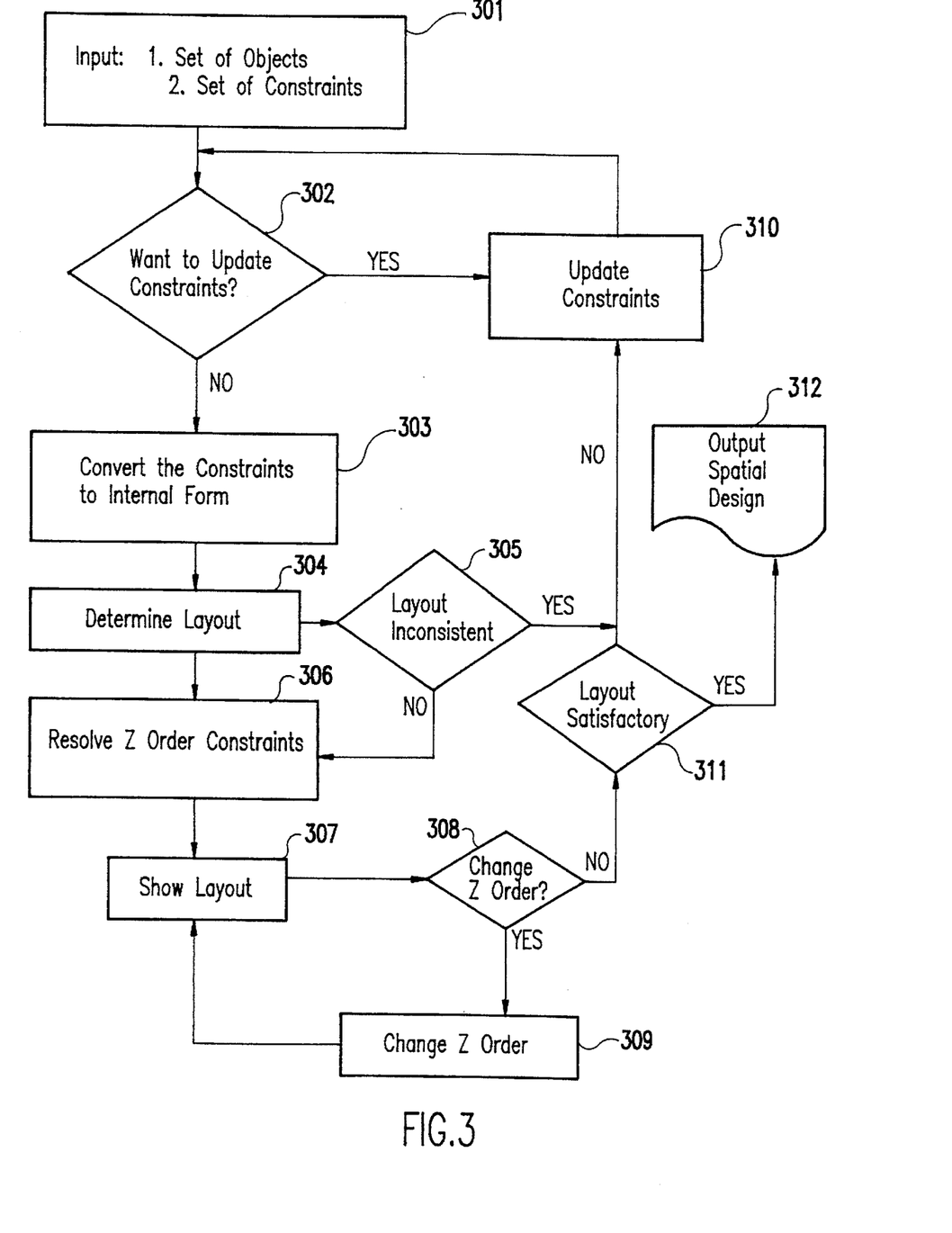
FIG. 3 is a flow chart showing the logic of the spatial layout process implemented on a multimedia computer authoring system.
Figure 4:
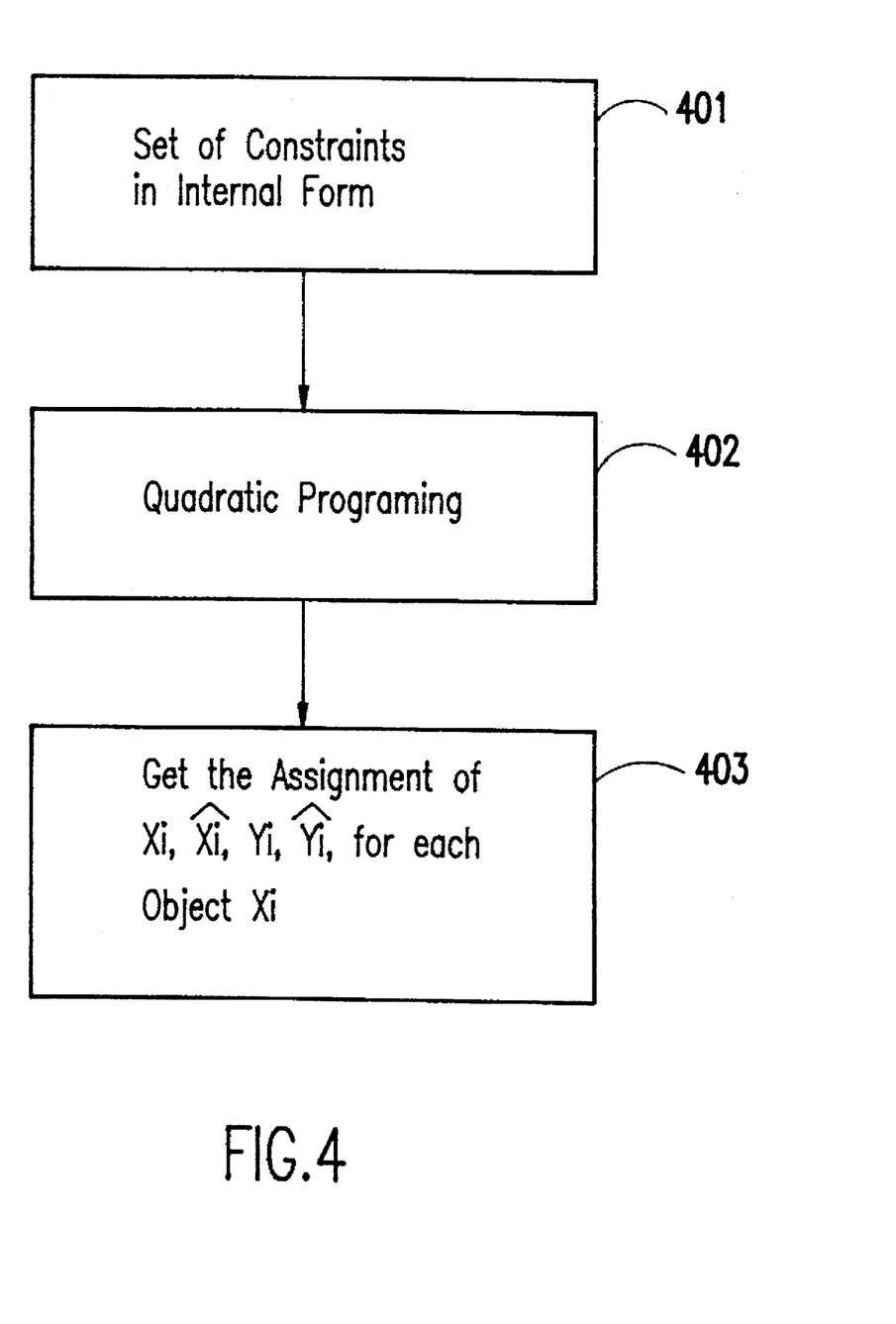
FIG. 4 is a flow chart showing the logic of the routine for determination of the clique layout.

Referring now to FIG. 3, there is shown the flow chart for the process according to the invention. The input at block 301 is (1) the set of objects in the clique and (2) the set of constraints for the episodes in the clique. The user is first given the opportunity to change or update the constraints in decision block 302. Initially, the user will most likely not want to change or update the constraints, and with that input from the user, the system converts the constraints to internal form in function block 303. Then, in function block 304, the system determines the layout based on the internal form of the constraints. The process for this is shown in FIG. 4, to which reference is made below. A test is made in decision block 305 to determine whether a consistent layout has been determined in function block 304, and if so, the Z-order constraints are resolved in function block 306. The spatial layout of the episodes in the clique are shown in function block 307.

The Z-List can be modified by the author interactively. Given a clique C, we let forefront(C) denote an episode that is in the forefront of all the episodes in S, the story, and we assign it the greatest depth, from the point of viewing from back to front. The following simple algorithm reorders the Z-List whenever an episode $E_j$ becomes the new forefront (C). First, find the position for i of $E_i$ that is the current forefront($C_i$) on the Z-List, then move the episode $E_j$ from its position j on the Z-List to the position i+1. Note that the algorithm operates by always identifying the forefront episode in a given clique. As an episode is selected as the new forefront, it is moved relative to the old forefront while the relative Z-ordering on other episodes remains unchanged. This allows a simple graphical user interface for screen design. Thus, for example, just by touching an episode on the screen, it becomes the current forefront. Note also that although the positions of episodes on the list are used as depth indices at the time of presentation, they are used only to determine the < relationships between episodes in a clique. Depth indices provide only a relative measure of depth. The process of changing the Z-order is shown in FIG. 3 where, after the layout is shown in function block 307, the user is given the opportunity to change the Z-order in decision block 308. If the user exercises that option, the Z-order is changed in function block 309, and the new layout is shown in function block 307.

In this invention, there are two kinds of constraints, base and relative. Base constraints concern size (i.e., area) of episodes, while relative constraints are spacing design rules specified by the author. We assume that for each episode type a minimum area, the optimum area, and a range of acceptable aspect ratios are given. Relative spacing constraints exist between episode types and between episode types and the display screen. Let $t_i$ denote an episode type (e.g., text, video, button) and let $E_i$ be an episode of type $t_i$. The rectangle which is associated with $E_i$ is defined by its lower left and upper right coordinates, $$x_i, y_i \text{ and } \hat{x}_i, \hat{y}_i, \text{ respectively, where } x_i + \hat{x}_i = w_i \text{ and } y_i + \hat{y}_i = h_i.$$

The base constraints are (1) a minimum area, A, requirement, minArea(O,A), meaning the minimum area of O is A, and an optimum area requirement, optArea(O,A), and (2) aspect ratio, R, i.e., the ratio of the width to the height of the object, as a minimum ratio, minRatio(O,R), and an maximum ratio, maxRatio(O,R). For example, the base constraints for object O might be minArea(O,40), optArea(O,50), minRatio(O,0.5), and maxRatio(O,0.7).

Let (O,O) and $w_{max}, h_{max}$ define the rectangle associated with the display screen. Let $$X = \{x_i | i=1, \ldots, n\}, W = \{w_i | i=1, \ldots, n\}$$

$$Y = \{y_i | i=1, \ldots, n\}, H = \{h_i | i=1, \ldots, n\}'$$

where $x_i, y_i, w_i, h_i \geq 0$, $w_i \leq w_{max}$, $h_i \leq h_{max}$. A placement P is an assignment of non-negative real numbers to the variables of $$Z = X \cup Y \cup W \cup H.$$

The base constraints are those that require the placement to respect the aspect ratios and the minimum area requirements of the episodes. Let $E_i$ be an episode, and let $a_i, a_i^o$ denote the minimum area and optimum area, $r_i, r_i^o$ denote the minimum and the maximum aspect ratio, $$\frac{w_i}{h_i},$$

defined for $E_1$. Then $$a_i \leq w_i \times h_i \leq a_i^o,$$

$$r_i \leq \frac{w_i}{h_i} \leq r_i^o.$$

From this, the bounds for the width and the height as linear inequalities are derived as follows:

$$\sqrt{a_i \times r_i} \leq w_i \leq \sqrt{a_i^o \times r_i^o},$$

$$\sqrt{\frac{a_i}{r_i^o}} \leq h_i \leq \sqrt{\frac{a_i^o}{r_i}}.$$

The relative constraints are those that define the relative placements of objects within the clique. These are defined as (1) rightOf($o_1,o_2$,d), meaning $o_1$ is to the right of $o_2$ by at least a distance d, (2) below($o_1,o_2$,d), meaning $o_1$ is below $o_2$ by at least a distance d, (3) topAlign($o_1,o_2$), meaning that $o_1$ and $o_2$ are to aligned, (4) bottomAlign($o_1,o_2$), meaning that $o_1$ and $o_2$ are bottom aligned, (5) leftAlign($o_1,o_2$), meaning that $o_1$ and $o_2$ are left aligned, and (6) rightAlign ($o_1,o_2$), meaning that $o_1$ and $o_2$ are right aligned. Let $d_{ij}$ represent the distance between $E_i$ and $E_j$, of type $t_i$ and $t_j$, respectively. The author can specify the following set of spacing design rules, which can be converted to a set of linear inequalities as follows, where the right arrow means "is converted to":

rightOf($t_i,t_j,d_{ij}$) → rightOf($E_i,E_j,d_{ij}$) → $x_i < x_j + w_j + d_{ij} \leq x_j$, $d_{ij} > -w_i$;

below($t_i,t_j,d_{ij}$) → below($E_i,E_j,d_{ij}$) → $y_i < y_j + h_j + d_{ij} \leq y_j$, $d_{ij} > -h_i$;

topAlign($t_i,t_k$) → topAlign($E_i,E_k$) → $y_i + h_i = y_k + h_k$;

bottomAlign($t_i,t_k$) → bottomAlign($E_i,E_k$) → $y_i = y_k$;

leftAlign($t_i,t_k$) → leftAlign($E_i,E_k$) → $x_i = x_k$;

rightAlign($t_i,t_k$) → rightAlign($E_i,E_k$) → $x_i + w_i = x_k + w_k$.

There may be more than one episode of the same type. Let $E = \{E_1, \ldots, E_n\}$ be a set of episodes of type $t_i$, $n \geq 2$. The author may choose one of the following spacing design rules:

sameType($E_i,E_j$) → rightOf($E_i,E_j,d_{ij}$), sameType($E_i,E_j$) → below($E_i,E_j,d_{ij}$).

By including the following constraints explained previously, we complete the conversion in function block 303 in FIG. 3 to internal form. For each object $O_i$, $$x_i + w_i = \hat{x}_i$$

$$y_i + h_i = \hat{y}_i$$

$$0 \leq x_i, \hat{x}_i \leq w_{max}$$

$$0 \leq y_i, \hat{y}_i \leq h_{max}$$

$$w_i, h_i \geq 0$$

Having specified the constraints as a set of linear inequalities, we can use various constraint solving techniques to solve the problem. The goal is to obtain a placement, P, where the episodes are spread across the display screen uniformly, subject to the constraints. The determination of the layout, function block 304 in FIG. 3, is performed according to the process shown in the flow chart of FIG. 4, to which reference is now made. The set of constraints in internal form is obtained in function block 401 from function block 303. These constraints are subjected to quadratic programming in function block 402 with the objective function to maximize the sum of distances between each pair, $(x_i,y_i)$ and $(x_j,y_j)$. See, for example, S. Glass, *Linear Programming Methods and Applications*, McGraw-Hill (1975).

The objective function as formulated above does not guarantee the best uniform distribution of episodes on the screen. However, it will find a placement, P, where the objects are spread on the screen by maximizing the sum of the distances between pairs. The solution guarantees a selection which satisfies the set of constraints, if there is a solution, and report a failure to find a solution if there is no solution. The output of the quadratic programming in block 402 is provided in block 403 as the assignment of the lower left and upper right coordinates for each object $x_i$.

Returning to FIG. 3, there is no guarantee that the procedure will find a legal layout on the first try, since the constraints may be impossible to satisfy. We say that a screen layout is legal if the layout satisfies all the base constraints, the Z-order constraints, and the relative spacing constraints. For a given clique, the goal is to automatically obtain a layout that is legal. This is determined in decision block 305. The practice of the invention is, however, interactive providing the author with a more manageable initial layout, which can then be further refined. If a consistent layout is not found, the author may specify new a set of constraints in function block 310 and repeat the design process until a desirable design is found. The option to change or update constraints is provided to the user initially, when the set of objects and set of constraints are loaded, when an inconsistent layout is found in decision block 305, and also in decision block 311 after the layout has been shown but the user is still not satisfied with the displayed results. When a desirable design is found, the spatial design is output in output block 312.

Figure 5:
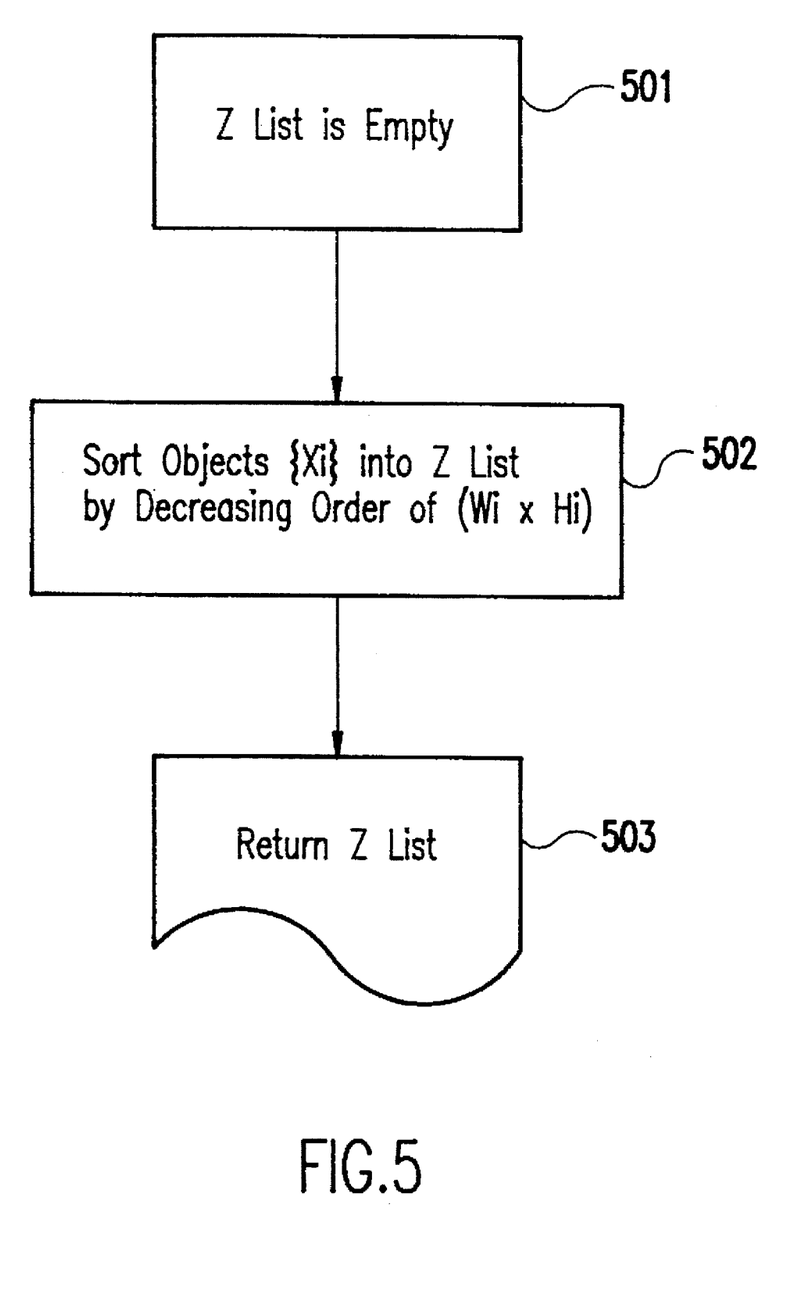
FIG. 5 is a flow chart showing the logic of the routine for resolution of Z-order, constraints.

The resolution of the Z-order constraints in function block 306 is accomplished according to the procedure shown in FIG. 5, to which reference is now made. Initially, the Z-List is empty in function block 501. The objects in the set $\{O_i\}$ are sorted into the Z-List by decreasing order of area in function block 502. That is, the larger area objects are displayed at a greater depth than smaller area objects so as not to occlude a smaller area object. The output in output block 503 is a populated Z-List.

Figure 6:
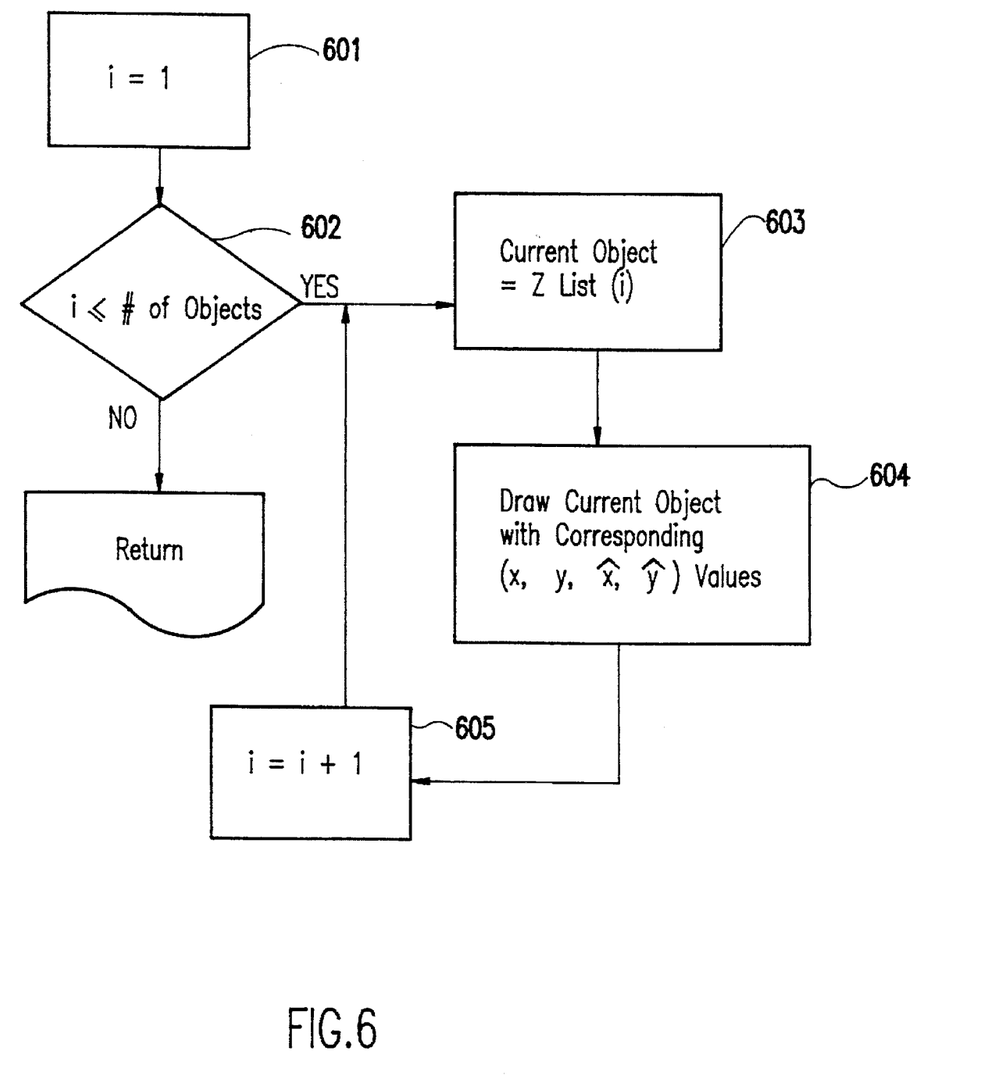
FIG. 6 is a flow chart showing the logic of the routine for showing the layout of the objects in the clique.

Once the Z-order constraints have been resolved in function block 306 in FIG. 3, the layout is displayed in function block 307. This process is illustrated in FIG. 6, to which reference is now made. This is an iterative process, and initially the value i is set to "1" in function block 601. A test is then made in decision block 602 to determine if i is less than or equal to the number of objects. If so, the current object is set to object i in the Z-List in function block 603. That object is then drawn in function block 604 with the corresponding values for the lower left and upper right values defining the rectangle for the object. Then in function block 605, i is incremented by one, and the test is again made in decision block 602 to determine if all objects of the clique have been processed. When all objects have be processed (i.e., drawn on the screen), the routine ends.

Figure 7:
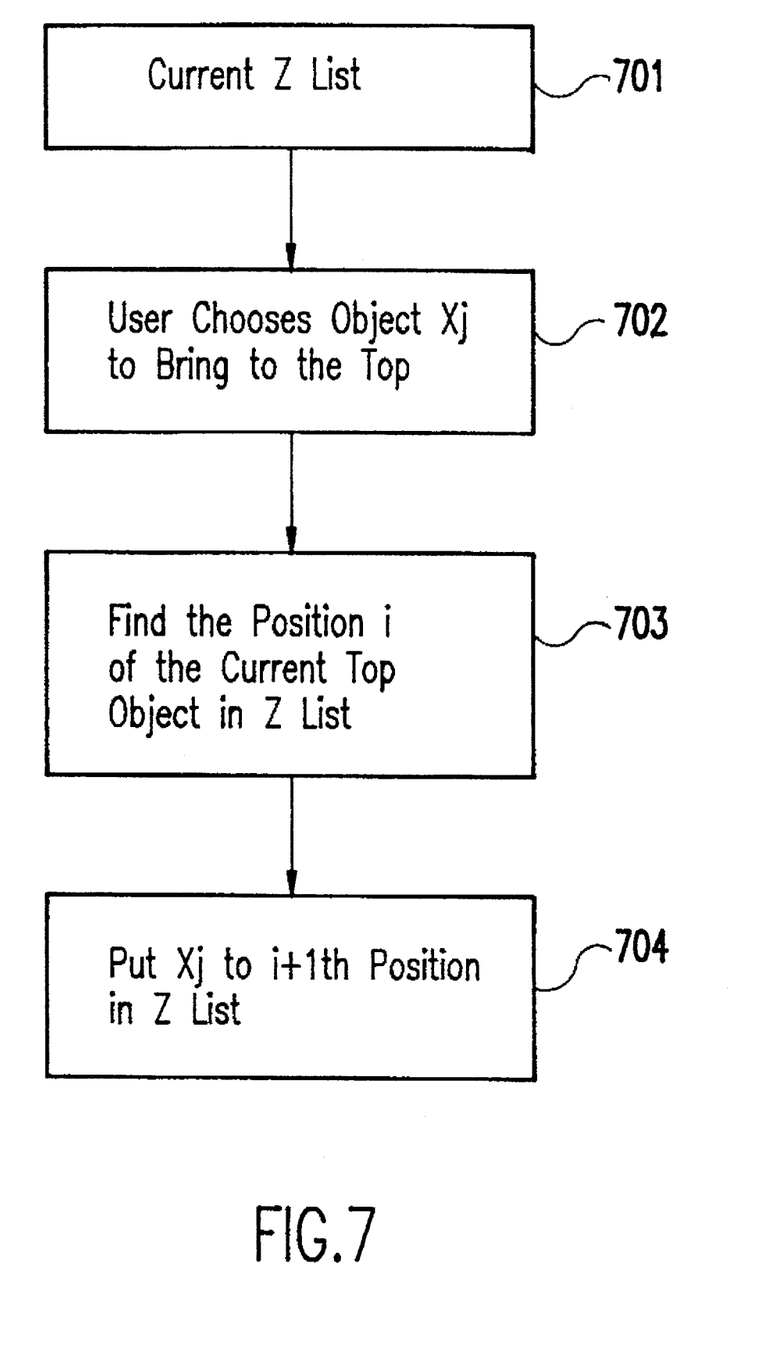
FIG. 7 is a flow chart showing the logic of the routine for changing the order of objects in the Z-List.

As mentioned, the user is provided with the option of changing the Z-order in decision block 308 in FIG. 3. The process of changing the Z-order in function block 309 is illustrated in FIG. 7, to which reference is now made. The current Z-List is retrieved in function block 701. The user chooses an object $X_i$ to bring to the top of the display. This can be done, for example, by simply selecting the object with a pointing cursor controlled by a pointing device, such as a mouse. Once the desired object is selected by the user, the position i of the current top object is found in the Z-List in function block 703. Then, in function block 704, the Z-List is reordered to reflect the new top object's position in the Z-List.

The invention described so far focuses on designing a screen layout for a given clique. But given a series of cliques, there are some very unique and important properties which may be used to advantage in authoring a multimedia document. These properties are what we call constraint propagation. That is, if an object is placed at location (x,y) with dimensions (w,h), the same object may be displayed along with another group of objects after some time. When this happens, rather than moving the object around, we may want to fix the location (x,y) and the dimensions (w,h) and let the other objects move around the fixed object. This is what we mean by constraint propagation.

Figure 8:
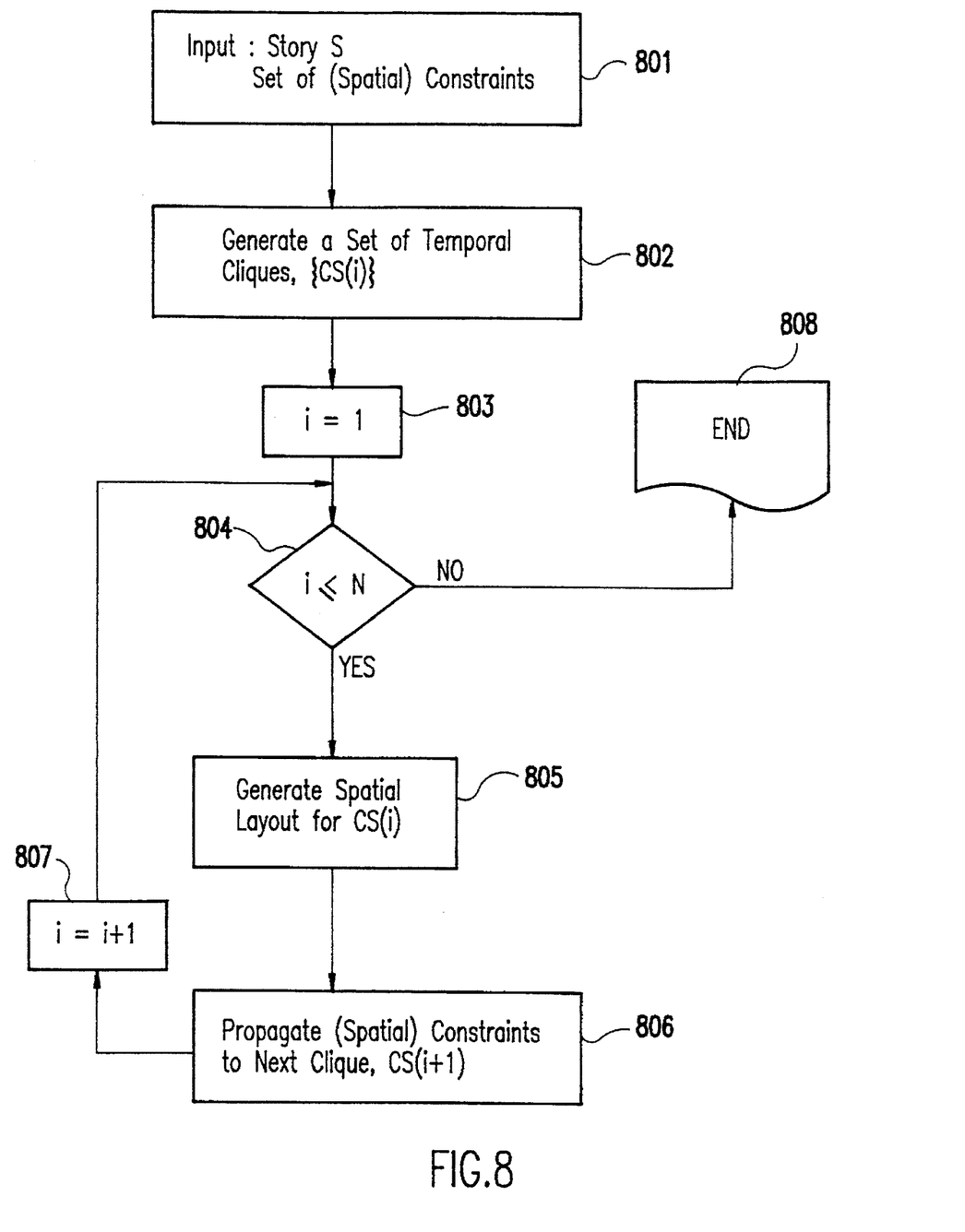
FIG. 8 is a flow chart showing the logic of the process of generating the spatial layout for the whole multimedia story.

With this in mind, we can use the process described with reference to FIG. 3 to generate the spatial layout of the whole story. This process is shown in FIG. 8, to which reference is now made. In function block 801, the input is a story, S, and set of spatial constraints. From this story, we generate a set of temporal cliques, $\{CS(i)\}$, of story S in function block 802. At this point, an iterative loop is entered. The loop is initiated in function block 803 by setting the value of i to one. Then a test is made in decision block 804 to determine if i is less than or equal to N, where N is the number of cliques. If so, we generate a spatial layout for the current clique, CS(i), in function block 805. This can be done by calling the process described and illustrated in FIG. 3. In this case, the set of objects in block 301 is the set of objects in the clique CS(i). The set of constraints in block 301 is the constraints given in block 801 which involve the object $O_j$ in CS(i). Next, in function block 806, the spatial constraints are propagated to the next clique, CS(i+1). The value of i is incremented in function block 807 before a return is made to decision block 803. Thus, the "propagated constraints" of function block 806 are added to the input set of constraints in block 301 of FIG. 3.

In calling the process of FIG. 3, we slightly change the way to get the Z-List, function block 306 explained in FIG. 5. In this case, after we make the Z-List in function block 502, we check if it is consistent with a "propogated Z-order". For each object to determine if the relation $O_j \leq O_k$ in the propagated Z-order is true; that is, we check to see if object $O_j$ precedes object $O_k$ in the Z-List. If not, we move object $O_k$ to the next position of object $O_j$. With this change, we can use the process described in FIG. 3 for generating the layout for clique CS(i) in block 805.

Figure 9:
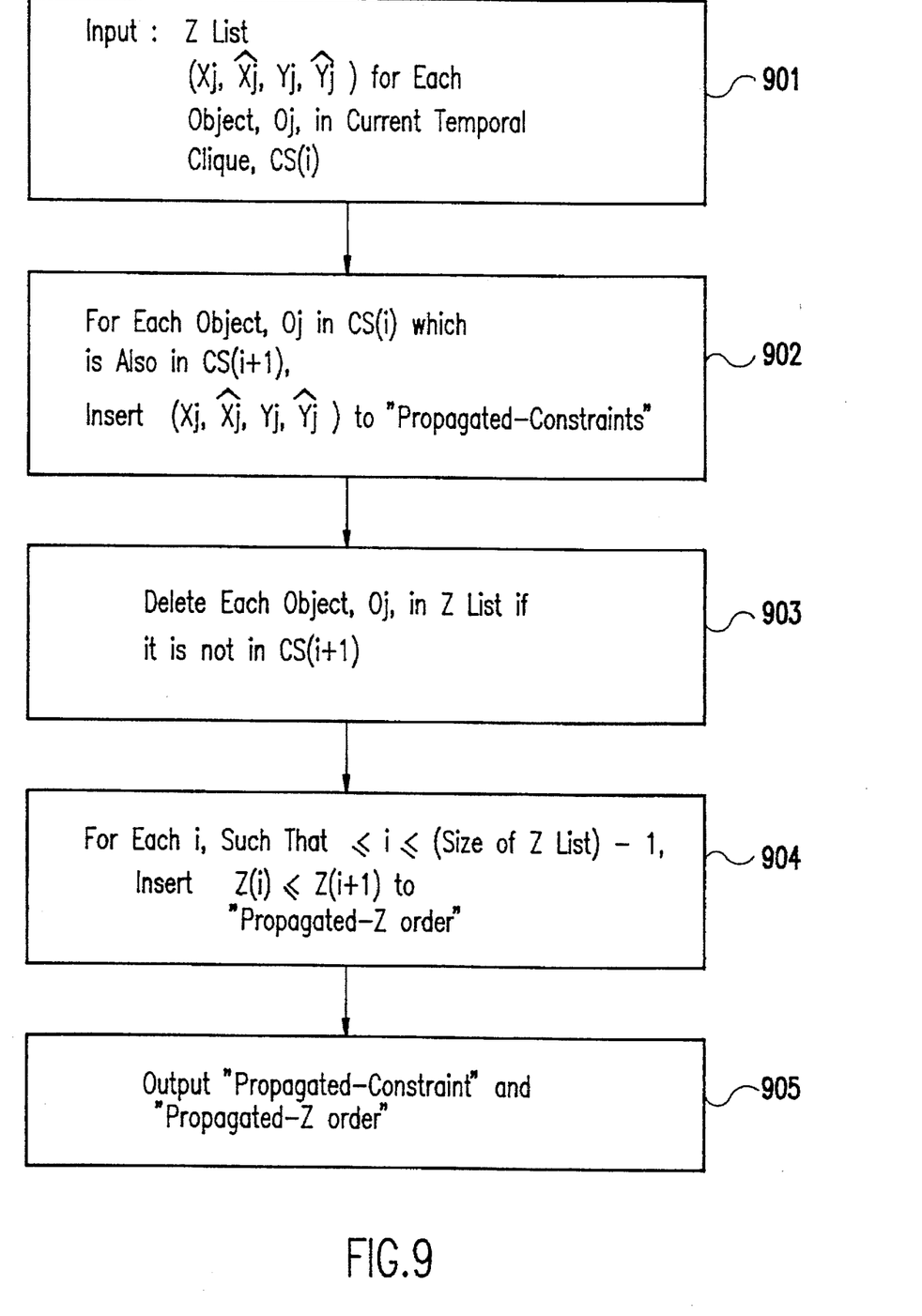
FIG. 9 is a flow chart showing the logic of the routine of propagating spatial constraints to the next clique called in the process shown in FIG. 8.

The process of propagating the spatial constraints in function block 806 is shown in FIG. 9, to which reference is now made. In function block 901, the Z-List is input. This includes the lower left and upper right locations defining each object, $O_j$, in the current temporal clique, CS(i). Then in function block 902, for each object $O_j$ in clique CS(i) which is also in clique CS(i+1), the locations of the lower left and upper right locations are inserted as a propagated constraint. Each object $O_j$ not in the clique CS(i) is deleted from the Z-List in function block 903. For each i, such that $$1 \leq i \leq (\text{size of Z-List})-1,$$

$Z(i) \leq Z(i+1)$ is inserted to the propagated Z-order in function block 904. The "propagated constraint" and "propagated Z-order" is output in output block 905 to function block 807 to begin the next iteration of the loop. When all temporal cliques have been processed, as determined in decision block 804, the process ends.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for automatically obtaining a spatial layout for multimedia presentations comprising the steps of:

inputting a set of objects which are to be displayed simultaneously on a computer display screen during a multimedia presentation, the set of objects being defined as a clique and a multimedia presentation being comprised of a plurality of cliques in a predefined order, and inputting a set of base constraints, defining sizes and aspect ratios, and relative constraints, defining relative positions of objects in the clique;

operating on the constraints of the objects in the clique to determine an initial layout according to predetermined constraints;

resolving a spatial design for a multimedia clique in terms of three dimensions, two dimensions defining a plane of a computer display screen and a third dimension defining a depth of overlapping objects, to determine locations of associated objects and their respective depths on the computer display screen;

displaying the spatial design as a layout of the objects, some of which may be overlapping, on the computer display screen;

upon displaying the spatial design, providing a user with an option to accept the spatial design;

if not accepted, prompting the user to change the constraints of the objects in the clique before attempting to again resolve the spatial design for the multimedia clique, a spatial design when accepted by the user being stored as a temporal clique of a multimedia presentation; and repeating the process for each clique in the multimedia presentation.

2. The method recited in claim 1 further comprising the steps of:

upon displaying the spatial design, providing a user with an option to change an order of the respective depths of the objects displayed on the computer display screen; and displaying the spatial design reordered according to an order selected by the user.

3. The method recited in claim 1 further comprising the steps of:

testing the spatial design to determine if a consistent layout has been generated based on the input constraints; and if an inconsistent layout has been generated, prompting the user to change the constraints of the objects in the clique before attempting to again resolve the spatial design for the multimedia clique.

4. A computer implemented method for automatically obtaining a spatial layout for multimedia presentations comprising a plurality of temporal cliques, each clique being defined by a set of visible objects on a computer display screen, said method comprising the steps of:

inputting a story comprising a plurality of visible objects occurring at various times during the story, each of said objects being defined by a set of spatial constraints;

generating a set of temporal cliques, the objects of each temporal clique in the set being displayed simultaneously on the computer display screen during the story, the set of objects in the clique being defined by a set of base constraints, defining sizes and aspect ratios, and relative constraints, defining relative positions of objects in the clique;

processing each temporal clique in succession by
operating on the constraints of the objects in each clique to determine an initial layout according to predetermined constraints, resolving a spatial design for each multimedia clique in terms of three dimensions, two dimensions defining a plane of the computer display screen and a third dimension defining a depth of overlapping objects, to determine locations of the objects in the clique and their respective depths on the screen, and displaying the spatial design as a layout of the objects for each clique in succession, some of which may be overlapping, on the computer display screen;

upon displaying the spatial design, providing a user with an option to accept the layout;

if not accepted prompting the user to change the constraints of the objects in the clique before attempting to again resolve the spatial design for the clique; and repeating the process for each clique in the story and for each object in a processed clique and also in a succeeding clique, propagating spatial constraints of that object to the succeeding clique prior to processing that clique.

5. The method recited in claim 4 further comprising the steps of:

testing an order of objects in a clique when objects have been propagated from a preceding clique to determine if the order of the objects in the clique is consistent after propagation of objects from the preceding clique; and re-ordering the objects in the clique to provide a consistent order before processing the clique.

6. The method recited in claim 5 further comprising the steps of:

upon displaying the spatial design, providing a user with an option to change an order of the respective depths of the objects displayed on the computer display screen; and displaying the spatial design reordered according to an order selected by the user.

7. The method recited in claim 5 further comprising the steps of:

testing the spatial design to determine if a consistent layout has been generated based on the input constraints; and if an inconsistent layout has been generated, prompting the user to change the constraints of the objects in the clique before attempting to again resolve the spatial design for the multimedia clique.

8. An apparatus for automatically obtaining a spatial layout for a multimedia presentation composed of a defined set of temporal cliques connecting temporal information to spatial information, the set of temporal cliques forming a multimedia story, the apparatus comprising:

input means for inputting a set of objects which are to be displayed simultaneously on a computer display screen during a multimedia presentation, the set of objects being defined as a temporal clique, and inputting a set of base constraints, defining sizes and aspect ratios, and relative constraints, defining relative positions of objects in the temporal clique;

central processor means for operating on the constraints of the objects in the temporal clique to determine an initial layout according to predetermined constraints, said central processor means resolving a spatial design for a temporal clique in terms of three dimensions, two dimensions defining a plane of a computer display screen and a third dimension defining a depth of overlapping objects, to determine locations of associated objects and their respective depths on the computer display screen; and display means for displaying the spatial design as a layout of the objects, some of which may be overlapping, on the computer display screen, said central processor means, upon displaying the spatial design, providing a user with an option to accept the spatial design and, if not accepted, prompting the user to change the constraints of the objects in a temporal clique before attempting to again resolve the spatial design for the temporal clique, a spatial design when accepted by the user being stored by the central processing means as a temporal clique of a multimedia story, the central processor means repeating the process for each clique in the multimedia story.

* * * * *